Figure 1:
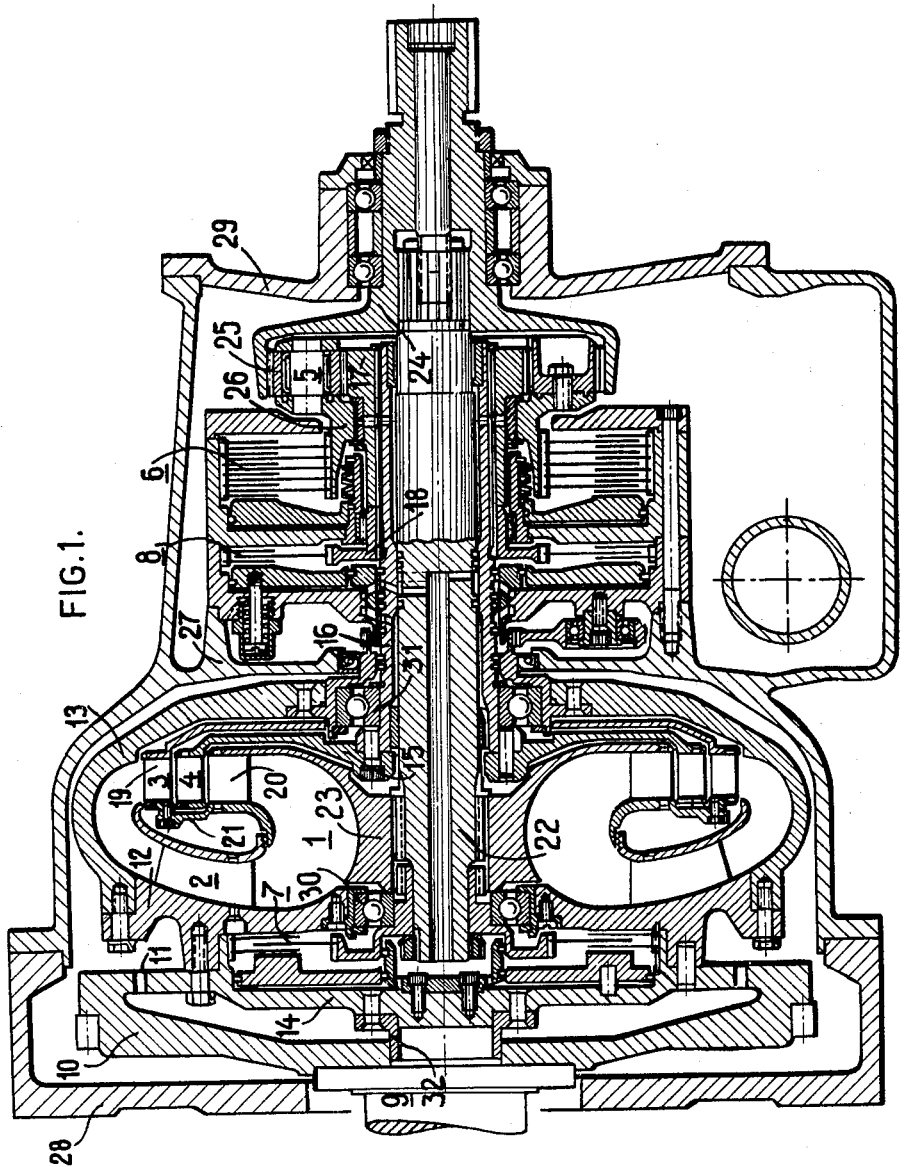

July 19, 1966   K. G. AHLÉN   3,261,232
POWER TRANSMISSION DEVICE
Original Filed June 9, 1958   2 Sheets-Sheet 1

United States Patent Office 3,261,232
Patented July 19, 1966

3,261,232
POWER TRANSMISSION DEVICE
Karl Gustav Ahlén, Fridhemsgatan 2, Stockholm, Sweden
Continuation of application Ser. No. 741,208, June 9, 1958. This application Apr. 27, 1964, Ser. No. 365,555
3 Claims. (Cl. 74—732)

This application is a continuation of my pending application Serial No. 741,208, now abandoned, filed June 9, 1958, the latter application being a continuation-in-part of application Serial No. 267,676, now abandoned, filed January 22, 1952.

The present invention contemplates a power transmission comprising a combination of a hydraulic torque braking exceeding that engine braking effect obtainable with the engine engaged in second gear of a four speed gear box. The invention provides for hydraulic braking of two different braking effects, the lesser one together with the engine braking being comparable to that braking effect obtainable on engine braking with engagement of the third gear of a four stage mechanical gear box.

Besides enabling this braking effect the mechanical gear system according to the invention also provides for two more things, namely the use of the turbine member of the hydraulic system for obtaining a double rotation system which gives a very high torque multiplication at low speeds of rotation of the secondary shaft of the hydraulic torque converter, and also that the braking of the secondary shaft of the torque converter to a complete stop is made possible without further complications, consisting of braking or synchronizing members or the like, so as to enable shifting from one drive to another of the gears of a complementary gear box which may be connected to the secondary shaft. This braking of the secondary shaft my further be used per se for braking of a movable mass connected to the secondary shaft.

The invention is directed towards a power transmission and braking device for connecting a driving shaft and a driven shaft. In this transmission a hydraulic torque converter comprises a housing providing a hydraulic circuit having a first section in which the flow of the working liquid is outwardly directed, a second section in which the flow is inwardly directed substantially radially and two return bend sections which connect the sections for outwardly and inwardly directed flows. In this circuit are located blade rings arranged on pump, turbine and reaction members. The pump member is connected to the driving shaft and has one pump blade ring which is located in that part of the hydraulic circuit in which the flow is outwardly directed. The turbine member is connected to the driven shaft and has at least two turbine blade rings. The reaction member is connected to a reaction shaft and has at least one reaction blade ring, each of which is located in that part of the hydraulic circuit in which the flow is inwardly directed. The reaction member is further freely rotatable in relation to the housing of the circuit. Each reaction blade ring is located between two turbine blade rings, so that one turbine blade ring is located between the outlet of a reaction ring and the inlet of the pump blade ring. The transmission comprises further means including a reversing mechanism connecting the reaction and driven shafts for power transmission in either direction and means for controlling said reversing mechanism to drive the reaction member in a direction opposite to that of the turbine and pump members in order to provide a hydraulic braking effect above a speed ratio between the turbine and pump members at which the efficiency of the power transmission is zero.

The transmission may further comprise a direct drive clutch and means for simultaneously engaging said clutch and the means for controlling the reversing means in order to obtain a high braking effect.

The transmission may also comprise a brake for the reaction member and means for engaging this separately or simultaneously with the direct drive clutch.

The transmission may further comprise a mechanical transmitting connection between the driving and the driven shafts arranged in parallel with the hydraulic torque converter.

Figure 2:
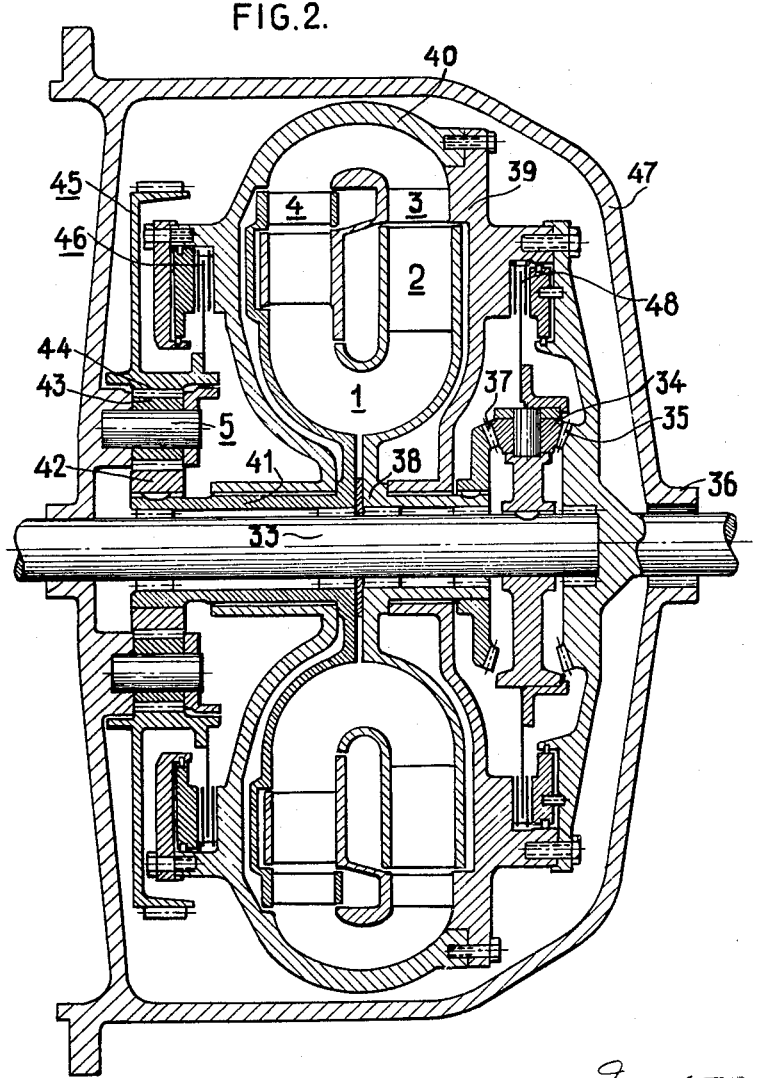

Further objects and advantages of the invention will be apparent from the following description taken in conjunction with the accompanying drawings wherein;

FIG. 1 is a longitudinal sectional view of a power transmission constructed in accordance with the invention; and FIG. 2 is a longitudinal sectional view showing a modified form of the invention.

FIG. 1 shows a hydraulic torque converter comprising a pump member 2, a turbine member 3, a reaction member 4 and a housing providing a hydraulic circuit 1. Said circuit 1 comprises one part 49 in which the flow of fluid is substantially outwardly directed, one part 50 in which the flow of fluid is substantially inwardly directed, and two curved parts 51 and 52 respectively connecting said parts 49 and 50 for outward and inward flow.

The pump member 2 comprises a blade ring located in the part 49 of the hydraulic circuit in which the flow of the fluid is substantially outwardly directed and is driven by the engine shaft 9 through the flywheel 10 and a spline connection 11. The pump supports a rotating housing comprising the portions 12 and 13 which enclose the hydraulic circuit of the hydraulic torque converter and the portions 12 and 14 enclosing a direct drive clutch 7 for connecting the pump member with the turbine member. The direct drive clutch 7 is arranged as a pressure liquid regulated servo-motor controlled friction clutch. The reaction member 4 comprises a blade ring 53 located in the part 50 of the hydraulic circuit in which the flow of the fluid is substantialy inwardly directed, a disc 15 and a hollow shaft 16 on which is mounted a gear wheel 17 and a brake disc carrier 18 which is a part of a brake member 8. The turbine 3 comprises two blade rings 19 and 20 which are interconnected by means of a side ring 21 and are located in the part 50 of the hydraulic circuit in which the flow of the fluid is substantialy inwardly directed with blade ring 19 radially outwardly and the blade ring 20 inwardly of the reaction blade ring 53 so that the turbine blade ring 20 is located between the outlet of the reaction blade ring 53 and the inlet of the pump blade ring. The outlet of the blade ring 20 is located further away from the axis of rotation than the inlet of the pump blade ring. The turbine member further comprises a disc 23 and a shaft 22. The turbine shaft 22 is arranged inwardly of the hollow shaft 16. On this turbine shaft 22 there is mounted another gear wheel 24. The gear wheels 17 and 24 are parts of a reversing gear 5. Said reversing gear 5 further comprises a suitable number of planet wheels which are carried by a holder 26. Said holder 26 is journalled so as to be able to rotate freely but may also be locked by means of the brake 6. The reaction member shaft which is rotatably mounted on the turbine shaft 22 may be held against rotation by means of the brake 8. The stationary members of the brake 6 and 8 are fixed to a stationary housing 27 bolted to the flywheel casing 28 and enclosing the rotating housing, the reversing gear and the brakes. The turbine shaft 22 has an extension journalled in an end wall 29 which is bolted to the housing 27. The rotating housing is journalled by means of the bearing 30 on the turbine shaft and the bearing 31 on the reaction member shaft. It is supported at 32 by the flywheel of the entire shaft. The brakes 6 and 8 described above are operated by means of hydraulic servo-motors.

The transmission shown in FIG. 1 may be operated either as a continuous automatic torque converter or as a direct drive device between the input and output shafts of the unit. In the transmission the hydraulic torque converter may also be utilized as a hydraulic brake, which according to the invention has a very high efficiency.

By interconnecting the pump and turbine members through the clutch 7, and simultaneously engaging the reversing gear 5 by means of the brake 6, the reaction member is forced to rotate in a direction opposite that of the pump and turbine members. If the brake 8 and the clutch 7 are engaged simultaneously and the brake 6 is released, a hydraulic braking is also obtained as the reaction member is stationary and the pump and turbine members are rotating in the same direction and at the same speed. This braking, however, will not be so strong as the braking with the brake 6 and the clutch 7 simultaneously engaged. With both types of braking the direct drive clutch is in engagement.

If only the brake 6 is engaged and the clutch 7 and brake 8 are free the device with the reversing gear will permit use of the blade system of the hydraulic torque converter as a double rotation system, which in a known manner gives a high efficiency at low speed ratio between the turbine and pump members. To obtain high efficiency in the intermediate speed range, the reaction member 4 may be stalled by means of the brake 8, the brake 6 and the clutch 7 being released. Engagement of clutch 7 and release of the brakes 6 and 8 enables direct drive to be effected, the whole hydraulic system rotating as a unit without effecting significant losses.

In a combination of a hydraulic torque converter with a rotating casing and a mechanical gear mechanism of the dog clutch type, embodying the present invention, the secondary or turbine member of the converter can be stalled upon engagement of the dog clutches through simultaneous engagement of the brakes 6 and 8, which may be used as a reversing gear step, whereby at least two of the synchronizing members are dispensed with in the mechanical gear.

Further the advantage is gained that the release of the clutch 7 and the brakes 6 and 8 gives a very low torque transmission in the converter which is advantageous for example, in a vehicle ready to start, or for synchronizing of various gear steps in a complementary gear box working together with the converter.

According to the present invention the advantages of the hydraulic torque converter have been combined with those of a mechanical gear resulting in a better efficiency than hitherto known. These advantages of the mechanical gear mechanism include among others the possibility of a very strong engine braking and of a high efficiency at low speed ratios between the secondary and primary members. In the hydraulic torque converter according to the invention these advantages have been combined with a continuous and automatic torque multiplication and capability of a soft engagement of braking.

Through the combination of engine braking with different strong hydraulic braking the desired braking effect can be obtained and shifting from one braking to another may be established without interrupting the braking force.

FIG. 2 shows another embodiment according to the invention, corresponding members of FIG. 1 being designated by the same numerals.

This embodiment is characterized by a reversing gear mechanism between the rotatably mounted reaction member 4 and the turbine member 3, but the turbine member is also provided with a so-called "split torque" device for transmitting torque from the engine to the turbine and simultaneously to the output shaft. This device consists therein that part of the engine torque is transmitted through a gear mechanism, for example of the planet wheel type, directly to the secondary shaft, whereas the other part of the engine torque is led to the primary member of the hydraulic torque converter. The distribution of the torques is determined by the gear ratio in this form of mechanism. At 33 is denoted the input shaft which is driven by the engine. This shaft carries planet wheels 34 which in turn mesh with a gear rim 35 on the output shaft 36 of the transmission, and also mesh with a gear rim 37 on the shaft 38 of the pump member 2. In this embodiment the turbine member 3 is formed as a rotating casing constituted by the end wall 39 and the housing 40 containing the hydraulic system. The reaction member is provided with a shaft 41 and a gear wheel 42, which is a part of the reversing gear 5 having planet wheels 43 and an outer wheel 44, provided with members 45 for braking to a stop and further with the clutch 46 for connection with the shaft 36 over the housing 39, 40. The embodiment according to FIG. 2 is also provided with a clutch 48 for direct connection of the primary shaft to the secondary shaft.

The mode of operation in this case is similar to that of the device shown in FIG. 1, only with that difference which will result from the different design of the reversing gear 5. This reversing gear may however also in this case be made similar to that shown in FIG. 1, as the embodiment according to this figure may be replaced by that shown in FIG. 2. In the form shown in FIG. 2 the braking of the planet wheel carrier 26 is replaced by the clutch 46 since here the planet wheels are bolted directly to the stationary casing 47.

The locking mechanism of brake 6, as shown in FIG. 1, is according to FIG. 2 replaced by the locking mechanism for the clutch 46. The locking of the brake 8 in FIG. 1 corresponds to the brake 45 as shown in FIG. 2.

The invention is not limited to the embodiments now shown and described but it may be further varied in several manners within the scope of the claims. For example a hydraulic torque converter having a stationary casing may be used instead of one with rotating casing.

What I claim is:

1. A power transmission and braking device for connecting a driving shaft and a driven shaft, said device comprising a rotationally stationary structure, a hydrodynamic torque converter having a rotatably mounted housing connected to and rotated by said driving shaft, said housing providing a hydraulic circuit having a first section in which the flow of the working liquid is substantially radially outward, a second section in which the flow of said liquid is substantially radially inward and radially inner and outer return bend sections connecting said first and said second sections, said converter comprising a pump member comprised of at least one ring of pump blades carried by said housing and located in said first section of said circuit, a turbine member freely rotatable with respect to said housing and comprising a blade carrying part carrying at least two rings of turbine blades located in said circuit and a shaft part co-axial with said housing for delivering power to said driven shaft, a reaction member freely rotatable with respect to said housing and comprising a hollow shaft part rotatably mounted concentrically around the shaft part of said turbine member and a blade carrying part carrying one or more rings of reaction blades each located in said second section of said circuit and further being located between two rings of turbine blades so that the last ring of turbine blades is located between the outlet of a ring of reaction blades and the inlet of a ring of pump blades, means including gearing connecting the shaft parts of said turbine and reaction members for power transmission therebetween in either direction, said means further including releasable braking means for anchoring an element of said gearing to said stationary structure and said gearing being constructed to impose rotation in opposite directions on said shaft parts when said braking means is engaged, and clutch means located on the power input side of said housing providing a mechanical power transmitting connection between said driving and driven shafts, said clutch means and said braking means being selectively operable, whereby to permit selective engagement of either one of said means or simultaneous engagement of both.

2. A power transmission as defined in claim 1, in which the outlet of said ring of turbine blades located between a ring of reaction blades and said ring of pump blades is located farther away from the axis of rotation of said power transmission than the inlet of said ring of pump blades.

3. A power transmission as defined in claim 1 in which said reaction member is provided with a separately operable brake, whereby to permit selective engagement of said brake and said direct drive clutch to thereby permit said brake and said direct drive clutch to be engaged at the same time.

References Cited by the Examiner
UNITED STATES PATENTS

| | | | |
|---|---|---|---|
| 2,707,539 | 5/1955 | Marble | 74—732 X |
| 2,853,855 | 9/1958 | Ahlen | 74—731 X |

FOREIGN PATENTS

| | | |
|---|---|---|
| 894,056 | 3/1944 | France. |

DAVID J. WILLIAMOWSKY, *Primary Examiner.*

DON A. WAITE, *Examiner.*

T. C. PERRY, *Assistant Examiner.*